Figure 1:
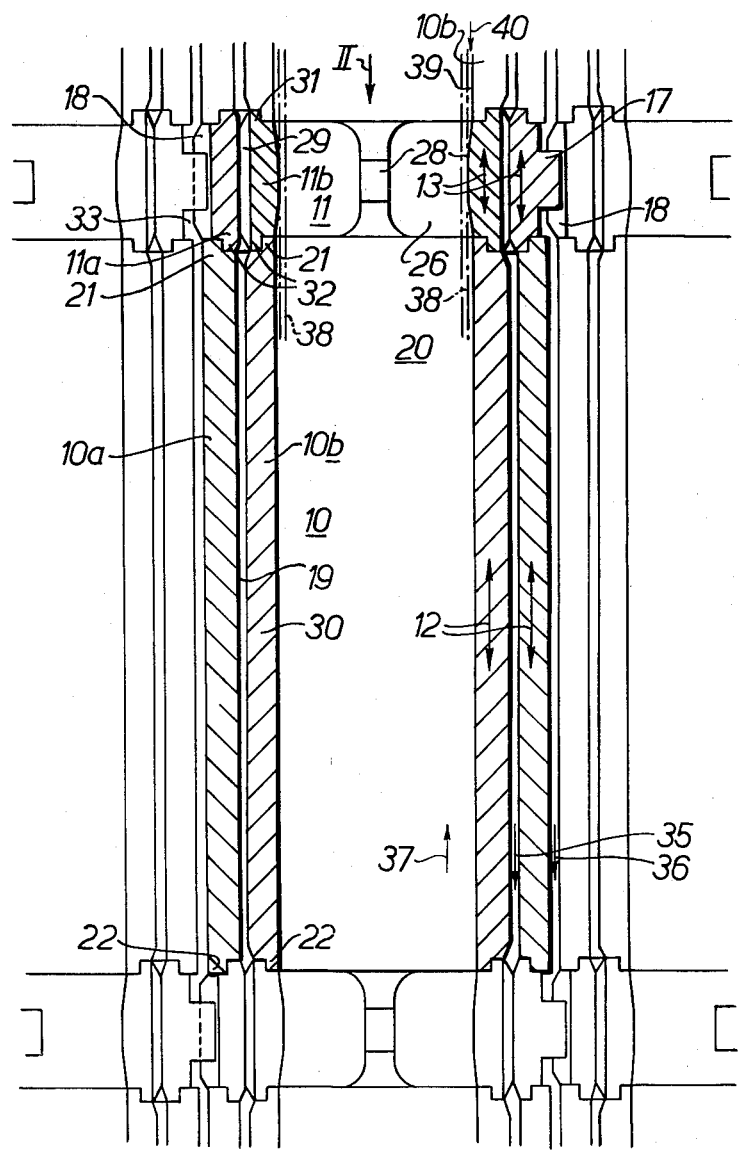

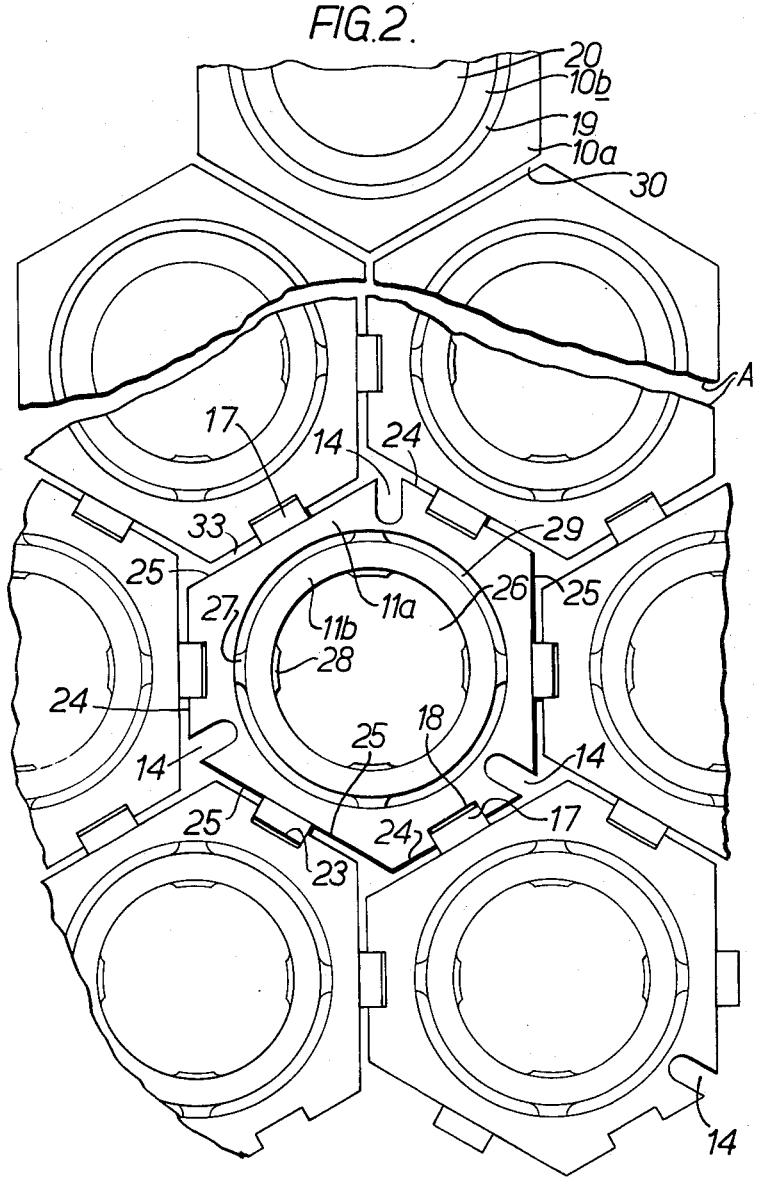

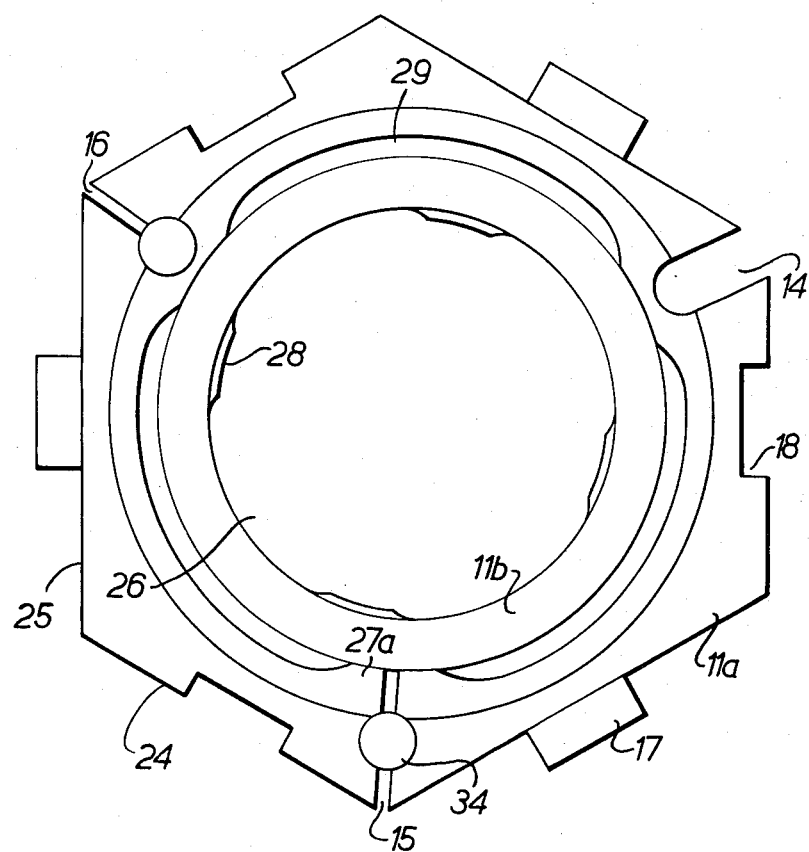

United States Patent Office 3,259,548
Patented July 5, 1966

3,259,548
MODERATOR STRUCTURES FOR NUCLEAR REACTORS
James Douglas Thorn, Appleton, Warrington, William Rodwell, Culcheth, Warrington, and Donald Albert Jobson, Helsby, England, assignors to United Kingdom Atomic Energy Authority, London, England
Filed May 27, 1963, Ser. No. 283,467
Claims priority, application Great Britain, June 1, 1962, 21,331/62
8 Claims. (Cl. 176—84)

This invention relates to nuclear reactors and it is concerned with graphite moderator structures therefor.

The behaviour of graphite under irradiation has always involved a number of uncertainties. It has been generally accepted that a Wigner growth character exists.

The inventors now foresee the use of graphite under conditions such that it might no longer follow the Wigner growth character which has been accommodated by a number of well-known designs) but follow instead an irregular and pronounced dimension change which might involve both growth and shrinkage and may have a thermal conductivity which deteriorates with irradiation. This change in character no longer allows the technology developed as a consequence to the discovery of Wigner growth to be used.

The inventors accordingly submit their advances in the art of moderator structures in a structure consisting as the basic unit an elongate brick of moderating material connected at one end (such as by spigots) to a single tile of moderating material, the bricks being in two spaced coaxial parts both having lengthwise grain and the tiles also being in two spaced coaxial parts both having their grain in the same direction as the bricks, the outer of the tile parts having surfaces adapted for interlocking engagement with adjacent tiles of the structure and allowing dimension changes at the tiles without creating instability in the structure.

Preferably the tiles are radially weakened to provide hoop stress relief.

The invention, expressed in another way, also comprises a nuclear reactor graphite moderator structure, of the kind comprising a graphite brick arrangement defining a lattice of fuel element channels, wherein each fuel element channel is circumscribed basically by a pair of spaced coaxial graphite tubes, the inner one being thicker and with the grain in the graphite running along the length of the tubes, at least the outer one of the pair comprising an alternating arrangement of long cylinders and short cylinders, the short cylinders having interconnecting radial keys and keyways to give a network of stability to the structure and the long cylinders and the inner one of the pair of spaced tubes deriving their location from said network.

In order to make the graphite moderator structure dense the outer of the pair of tubes may have a hexagonal or square-section outer wall.

The inner of the pair of the graphite tubes may be made removable from the core structure and, in this respect, the invention brings forth a graphite moderator structure wherein about 50% of the structure is removable, this being the proportion subject to the severest conditions under reactor operation. The remaining 50% approximately provides a dominant structural quality and is less affected by reactor operating conditions by virtue of lack of proximity to fast flowing coolant, and of being thinner in section so that it is less stressed by temperature changes and is subjected to a lower fast neutron flux and hence inherently more capable of accepting its structural function of supporting removable and hence renewable graphite.

The invention will now be further described with reference to the accompanying drawings wherein:

FIGURE 1 shows in sectional elevation a basic brick and tile unit in association with adjacent units (shown in outline), FIGURE 2 shows a plan view in the direction of the arrow II of FIGURE 1 and FIGURE 3 is a view in the same direction as the arrow II of a single tile showing radial weakening features.

In FIG. 1 a basic unit is shown consisting of a long brick 10 having at one end a single tile 11. The long brick 10 is in two coaxial parts 10a and 10b and has a grain in a direction indicated by arrows 12. The tile 11 is in two coaxial parts 11a and 11b with their grain in a direction indicated by the arrows 13. As shown in FIG. 3 the outermost of the tile parts is radially weakened by slots 14 or 15 or 16. The tiles have radial keys 17 and keyways 18. (The bricks and tiles adjacent to the unit described above are not shown in cross-hatched section, only in outline.)

In more detail, the part 10a is of a hexagonal form (see FIG. 2 above the break-lines A) and spaces 30 exist between adjacent parts 10a. The part 10b is of cylindrical form and defines a space 19 with the part 10a. A bore 20 exists along the part 10b. Top and bottom spigots 21, 22 respectively exist on both parts.

The part 11a is basically of hexagonal form (see FIG. 2 below the break-lines A), the basic hexagon being defined by the sides 24 of the parts 11a and the projecting edges 13 of the keys 17, the sides marked 25 and the keyways 18 being machined from the basic hexagon. This achieves more uniform wall thickness in the part 11a. The part 11b is of cylindrical form, has a bore 26, has (in FIG. 1 and FIG. 2) external centralising projections 27 and internal centralising projections 28. (In FIG. 3 the centralising projections between parts 11a and 11b are on the part 11a and have the reference numeral 27a.)

A space 29 exists between parts 11a and 11b. The parts have top and bottom spigots 31, 32 respectively mating with the spigots 22, 21 on the parts 10a, 10b. The tiles 11 are spaced apart by spaces 33.

FIG. 3 shows three alternative forms of radial weakening of the part 11a, namely the slot 14 which does not radially penetrate the part 11a, the slot 15 which does radially penetrate the part 11a and includes a fulcrum pin 34 and the slot 16 having a bulbous root.

Gas flow is intentionally created along the annular channels defined by spaces 19, 29, and 30, 33. This flow is reactor coolant which has not yet come into contact with the reactor fuel and is indicated by the arrows 35, 36. Arrow 37 indicates reactor coolant flow in the bores 20, 26 in which nuclear fuel elements are located. These fuel elements could typically be of a kind well known such as a cluster of small diameter fuel rods in a sleeve 38, (shown dotted), the sleeve 38 locating against projections 28. A further annulus 39 is then created outside the sleeve 28 along which a further coolant stream can flow as indicated by arrow 40. Thus so far as the two parts of the bricks and tiles are concerned, the gas flows 36, 35, and 35, 40 ensure that surface temperature differences across their parts in any one transverse plane are kept low. There will necessarily be some temperature gradient across the parts of the bricks and tiles as heat is generated within the parts but it should be small and symmetrical. At the start of the life of the reactor this should be very small as the unirradiated graphite has a good thermal conductivity. As irradiation takes place temperature gradients will increase as the conductivity falls. The flows 35, 36 and 40 can be in parallel with flow 37 or in series. Flow 37 can be in either direction.

In the drawing the keys on the tiles 11 are integral with the tiles. They could be loose keys but this increases the number of clearances and introduces more slackness into the graphite structure.

A hexagonal pattern of brick and tile has been shown. A square pattern could be used but the hexagonal pattern has the merit of giving a more uniform wall thickness.

Typical dimensions of the brick and tiles are:

|  | Inches |
|---|---|
| Length of bricks | 30 |
| Length of tiles | 4 |
| Core of part 10b | 7¼ |
| Across flats of part 10a | 12⅜ |
| Minimum wall thickness of parts 10a, 10b | 1⅛ |

There is distinct merit in restricting the keying to the tiles only. With keying provided over the bricks there is a risk that bowing over the long lengths could prevent the necessary degree of freedom for sliding between keys and keyways. Keys and keyways in the bricks would also give rise to stress concentrations in the bricks. There is also an economic advantage, the keys and keyways representing added cost of manufacture especially in the preferred arrangement of integral keys. With the keys limited to four inches in every thirty four inches any added cost is limited to about 12% of the core. The parts 10a and 10b, can be made from a single block by a trepanning operation, thus the cost of a brick made in two parts is little different from that of a brick made as a unit. Trepanning is not possible for the parts 11a, 11b as shown because of the centralising projections. However, these projections could be made as separate inserts if required.

As an alternative construction, by making the wall thicknesses of the parts 10a, 10b ⅞″ and 1⅜″ respectively (the across flats dimension of parts 10a and the bore of part 10b remaining at 12⅜″ and 7¼″ respectively) the proportion of renewable graphite in the core becomes approximately 50%.

We claim:
1. A construction unit for a nuclear reactor moderator structure comprising an elongate brick of moderating material consisting of two tubular parts co-axially spaced and having lengthwise grain, a tile of moderating material connected to one end of the brick and consisting of two tubular parts co-axially spaced and having lengthwise grain in the same direction as the brick, the outer of the tile parts having its outer surfaces adapted for loose interlocking engagement with laterally adjacent and axially parallel tiles of the structure in a horizontal plane.

2. A construction unit according to claim 1, wherein the tile is radially weakened to provide hoop stress relief.

3. A construction unit according to claim 1, wherein the surfaces of the tile adapted for loose interlocking engagement have keys and keyways therein, the keys being formed integral with the tile.

4. A constructional unit according to claim 1 wherein the surfaces of the tile adapted for loose interlocking engagement have keys and keyways therein, the keys being removable from the tile.

5. A constructional unit according to claim 3, wherein the outer surfaces of the outer parts of the bricks and tiles are generally hexagonal.

6. A constructional unit according to claim 3, wherein the outer surfaces of the outer parts of the bricks and tiles are generally square.

7. A moderator structure for a nuclear reactor comprising a plurality of constructional units according to claim 1 stacked so as to provide alternate horizontal layers of bricks and tiles.

8. A nuclear reactor moderator structure comprising a graphite brick arrangement defining a lattice of fuel element channels wherein each fuel element channel is circumscribed basically by a pair of spaced co-axial graphite tubes, the inner one being thicker and with the grain in the graphite running along the length of the tubes, and the outer tube of each pair comprising an alternating arrangement of long cylinders and short cylinders, laterally adjacent short cylinders having inter-connecting radial keys and keyways to give a network of stability to the structure and the long cylinders and the inner one of the pair of spaced tubes deriving their location from said network.

References Cited by the Examiner
UNITED STATES PATENTS

| 2,864,759 | 12/1958 | Long et al. | 176—84 |
| 2,985,575 | 5/1961 | Dennis et al. | 176—43 |
| 3,011,961 | 12/1961 | Lemesle et al. | 176—84 |

L. DEWAYNE RUTLEDGE, *Primary Examiner.*

REUBEN EPSTEIN, *Examiner.*

M. J. SCOLNICK, *Assistant Examiner.*